(12) United States Patent
Bock et al.

(10) Patent No.: US 12,306,624 B2
(45) Date of Patent: May 20, 2025

(54) METHOD FOR PROVIDING AN AT LEAST PARTIALLY AUTOMATIC DRIVING FUNCTION AND/OR A PERSONALIZED FUNCTION IN A MOTOR VEHICLE

(71) Applicant: AUDI AG, Ingolstadt (DE)

(72) Inventors: Florian Bock, Nuremberg (DE); Michael Grabowski, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 190 days.

(21) Appl. No.: 18/157,588

(22) Filed: Jan. 20, 2023

(65) Prior Publication Data
US 2023/0236595 A1 Jul. 27, 2023

(30) Foreign Application Priority Data

Jan. 24, 2022 (DE) .................... 10 2022 101 488.6

(51) Int. Cl.
*G05D 1/00* (2024.01)
*B60W 30/12* (2020.01)
(Continued)

(52) U.S. Cl.
CPC ........... *G05D 1/0016* (2013.01); *B60W 30/12* (2013.01); *B60W 30/18163* (2013.01);
(Continued)

(58) Field of Classification Search
CPC .. G05D 1/0016; B60W 60/001; B60W 30/12; B60W 30/18163; H04M 1/724098; G06Q 10/109
See application file for complete search history.

(56) References Cited

U.S. PATENT DOCUMENTS 9,008,856 B2 * 4/2015 Ricci ..................... G06F 3/0484
701/1
10,027,759 B2 * 7/2018 Shannir ............... H04L 63/0876
(Continued)

FOREIGN PATENT DOCUMENTS

DE   10 2016 206 513 A1   10/2017
DE   10 2022 101 488.6    1/2022

OTHER PUBLICATIONS

Hegde, Zenobia: Your smartphone and the connected car. Mar. 15, 2018. 21 URL: https://www.iot-now.com/2018/03/15/78788-smartphone-connected-car/> [downloaded Aug. 23, 2022]; (3 pages).
(Continued)

*Primary Examiner* — Ramsey Refai
(74) *Attorney, Agent, or Firm* — STAAS & HALSEY LLP

(57) ABSTRACT

An example method of providing an at least partially automatic driving function and/or a personalized function in a motor vehicle as well as to the motor vehicle may include establishing a communication link between a communication interface of the motor vehicle and a communication interface of a mobile terminal, which is associated with a user of the motor vehicle; receiving terminal data transferred via the communication link in the motor vehicle, which is recorded on the mobile terminal and which describes at least navigation information and/or user information relating to the user; and providing an at least partially automatic driving function of a driver assistance system of the motor vehicle and/or a personalized function in the motor vehicle by evaluating the received terminal data.

16 Claims, 2 Drawing Sheets

(51) Int. Cl.
*B60W 30/18* (2012.01)
*B60W 60/00* (2020.01)
*G06Q 10/109* (2023.01)
*H04M 1/72409* (2021.01)

(52) U.S. Cl.
CPC ......... *B60W 60/001* (2020.02); *G06Q 10/109* (2013.01); *H04M 1/724098* (2022.02); *B60W 2540/21* (2020.02); *B60W 2555/20* (2020.02); *B60W 2556/45* (2020.02); *B60W 2720/10* (2013.01)

(56) References Cited

U.S. PATENT DOCUMENTS

| | | | | |
|---|---|---|---|---|
| 2013/0018567 A1* | 1/2013 | Lim | .................... | B60W 50/085 701/102 |
| 2013/0124064 A1* | 5/2013 | Nemoto | ............. | B60K 31/0058 701/1 |
| 2013/0190978 A1* | 7/2013 | Kato | ....................... | H04W 8/24 455/418 |
| 2015/0025711 A1* | 1/2015 | Kwon | ................... | B60R 16/037 701/2 |
| 2015/0192426 A1* | 7/2015 | Foster | ................ | G01C 21/3664 709/228 |
| 2016/0127529 A1* | 5/2016 | Kim | ........................ | H04L 67/12 455/418 |
| 2016/0197782 A1* | 7/2016 | Hort | ........................ | H04L 69/08 709/222 |
| 2018/0041584 A1* | 2/2018 | Shannir | ................. | H04W 12/08 |
| 2020/0254875 A1* | 8/2020 | Strandberg | ............ | G06F 3/0484 |
| 2020/0269808 A1* | 8/2020 | Cho | ....................... | H04L 9/0866 |

OTHER PUBLICATIONS

Donaldson, Alex: Charge it up: new maps features for electric vehicles. Jan. 27, 2021. 21 URL: https://blog.google/products/maps/charge-it-new-maps-features-electric-vehicles/> [downloaded Aug. 23, 2022]; (3 pages).

Examination Report dated Aug. 24, 2022 in corresponding German Patent Application No. 10 2022 101 488.6 (15 pages).

* cited by examiner

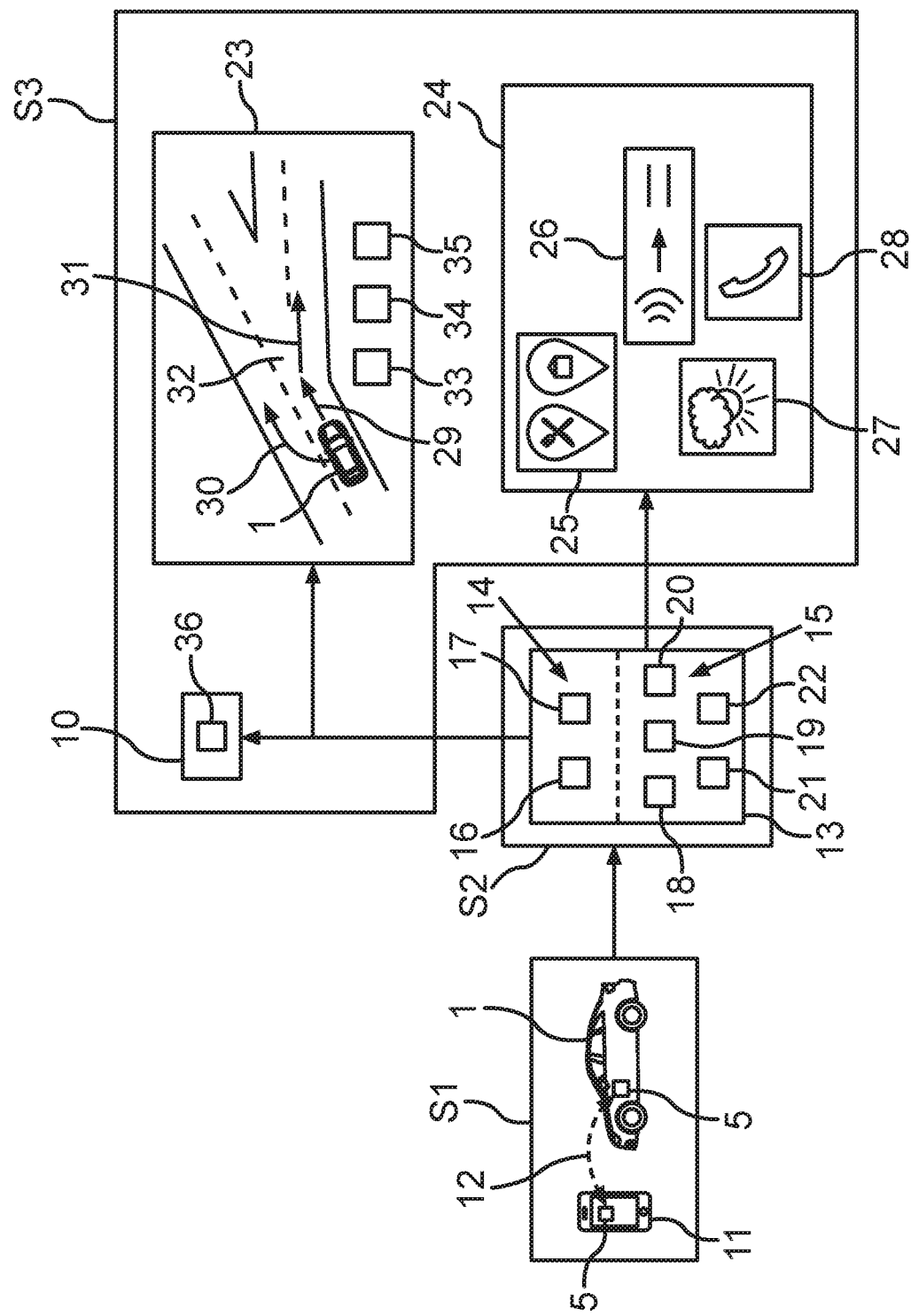

METHOD FOR PROVIDING AN AT LEAST PARTIALLY AUTOMATIC DRIVING FUNCTION AND/OR A PERSONALIZED FUNCTION IN A MOTOR VEHICLE

CROSS-REFERENCE TO RELATED APPLICATION

This application claims the benefit of German Application No. 10 2022 101 488.6, filed on Jan. 24, 2022, in the German Intellectual Property Office, the disclosure of which is incorporated herein by reference in its entirety

BACKGROUND

1. Field

The invention in accordance with described examples relate to a method for providing an at least partially automatic driving function and/or a personalized function in a motor vehicle. Further, the described examples relate to a motor vehicle.

2. Description of the Related Art

A user of a motor vehicle can use a mobile terminal such as for example a smartphone instead of a navigation system of the motor vehicle, to for example plan a travel route to a destination by a route planner application of the mobile terminal and to let the user be guided to the destination along the planned travel route. In the motor vehicle, a communication interface can for example be provided, via which a communication link between the mobile terminal and the motor vehicle can be provided. If the communication link exists, a user interface of the mobile terminal can for example be displayed on a display device of the motor vehicle such as for example an in-vehicle screen. Via the communication link, it is also possible that an actuation of an operating element on the display device is captured by of an actuation device of the motor vehicle and transferred to the mobile terminal. Hereto, the screen can for example be formed as a touch-sensitive screen and/or a button, switch, rotary-push switch and/or a key can be provided in the motor vehicle.

EP 2 972 097 B1 shows a system for transferring navigation data from a first mobile appliance to a second mobile appliance, wherein the mobile appliances can for example be a mobile phone and/or a positioning system in a vehicle.

EP 2 858 058 A1 shows a portable communication terminal, which ascertains information about a current position, a destination as well as a state of charge of an energy source in a motor vehicle and provides it to a server. Based on the received information as well as historic data, the server determines a location of charging for the motor vehicle and transfers the determined location to the portable communication terminal.

DE 10 2018 116 638 A1 shows an apparatus for receiving an input, which indicates a destination, and for determining if at least a part of a route to the destination is driven using an autonomous driving function by a motor vehicle. If navigation indications are output by a smartphone of a user of the motor vehicle, it can be communicated to the smartphone if the motor vehicle is in a self-driving mode or a manual driving mode.

SUMMARY

In an example, a solution is provided by which a motor vehicle may be supported with data from a mobile terminal. The described examples are specified by way of the subject matters of the independent claims. Advantageous examples with convenient and non-trivial developments may be specified in the dependent claims, the following description and the figures.

An example relates to a method for providing an at least partially automatic driving function and/or a personalized function in a motor vehicle.

The described examples of the invention are based on the realization that further data may typically not be transferred from a mobile terminal via a communication link to a motor vehicle than data describing a user interface of the mobile terminal and data describing an actuation of an operating element on the user interface. For this reason, a control apparatus of the motor vehicle for example does not receive information to the effect which destination is currently preset according to a route planner application. However, this information is interesting for various driver assistance systems in the motor vehicle, for example for a lane keeping assistant. Therefore, a more extensive data transfer from the mobile terminal to the motor vehicle should be effected.

The method comprises the following steps: first, establishing of a communication link between a communication interface of the motor vehicle and a communication interface of a mobile terminal, which is associated with a user of the motor vehicle, is effected. The user of the motor vehicle is for example a driver, owner and/or occupant of the motor vehicle. The communication link between the two communication interfaces can be formed as a tethered, in particular as a wired, or as a cordless, in particular as a wireless, link. The tethered link can be formed as a detachable cable link, for example provided by a charging cable. In case of the cordless communication link, it can be established via a local network (WLAN, for "wireless local area network"), a Bluetooth link (BLUETOOTH) and/or a mobile data network, for example based on the mobile radio standard Long Term Evolution (LTE), Long Term Evolution Advanced (LTE-A), Fifth Generation (5G) and/or Sixth Generation (6G). In a simple example, the communication link can be established as soon as the user positions the mobile terminal in the motor vehicle. A data exchange both from the mobile terminal to the motor vehicle and from the motor vehicle to the mobile terminal can be possible via the communication link. In an example, the communication link allows at least transfer of data from the mobile terminal to the motor vehicle. The mobile terminal is for example a mobile phone like a smartphone, a tablet and/or a portable computer, that is a laptop.

In a further method step, receiving terminal data, which is recorded on the mobile terminal, may be effected. In an example, the terminal data is stored on the mobile terminal. Alternatively or additionally thereto, it can be provided that the terminal data is stored on an external entity and can be transmitted from it to the mobile terminal, for example upon request. The terminal data can then for example be provided by the external entity via the mobile terminal. In this case, a user profile with user-specific data, which is associated with the user of the mobile terminal, is for example stored on the external entity. For example, the external entity is a computing device like a server or a backend.

The terminal data describes at least navigation information and/or user information relating to the user. The navigation information can for example be a destination input in the mobile terminal, which is for example recorded in a route planner application of the mobile terminal. The user information relating to the user can for example be a calendar entry, which has an appointment with a time of day associated with the appointment and/or a location associated with the appointment and which is for example recorded in a calendar application of the mobile terminal. The user information relating to the user can further describe a preference of the user, such as for example a hobby, a profession and/or a preference such as for example a favorite food. The user information relating to the user can for example be recorded in an application, which is installed in the mobile terminal, such as for example a cooking application, a game and/or a social media application.

The terminal data is transferred from the mobile terminal to the motor vehicle, that is, in other words, it is directly or at least indirectly provided by the mobile terminal and is received by the motor vehicle, that is by the communication interface of the motor vehicle. In the motor vehicle itself, the received terminal data may be provided to a control apparatus of the motor vehicle for further evaluation. For example, the control apparatus comprises at least one microprocessor and/or microcontroller, that is, it is formed as a computing device.

In a further method step, providing an at least partially automatic driving function of a driver assistance system of the motor vehicle and/or a personalized function in the motor vehicle may be effected by evaluating the received terminal data. The evaluation is for example effected by the control apparatus of the motor vehicle. In case of the navigation information, which is described by the received terminal data, the at least partially automatic driving function of the driver assistance system can for example be provided. In case of the user information relating to the user, which is described by the terminal data, the personalized function can for example be provided in the motor vehicle.

An example for the at least partially automatic driving function of the driver assistance system is a lane keeping assistant, which keeps the motor vehicle on a current lane, since it can be informed due to the navigation information transferred to it, which for example describes the destination and/or the travel route to the destination, that the lane currently traveled by the motor vehicle is to be kept or that a lane change is imminent. For example, if the navigation information only describes the destination, the control apparatus can for example independently ascertain the travel route and provide the corresponding information to the lane keeping assistant. The driver assistance system is for example formed to actuate or control a longitudinal and/or transverse guidance of the motor vehicle, thus to at least partially automatically take over the propulsion device, brake system and/or steering thereof.

An example for the personalized function in the motor vehicle is for example an automatic offer and/or initiation of a call by the control apparatus based on user information, which describes a calendar entry describing the call in the calendar application of the mobile terminal. The call can for example be performed by a hands-free headset in the motor vehicle.

In other words, the motor vehicle can provide functions comfortable for the user, which are provided based on the received terminal data, which does not originate from the motor vehicle itself, but from the mobile terminal. Thus, based on an extensive communication link between the mobile terminal of the user and the motor vehicle, the provision of the at least partially automatic driving function as well as the personalized driving function in the motor vehicle may be supported since the terminal data is transferred to the motor vehicle. Thus, the motor vehicle may be supported with data from the mobile terminal.

Information in terms of the described examples can be represented by data. The data for example includes at least one data element, in particular multiple data elements. The data can provide the information in coded manner, that is it represents an again interpretable representation of the information.

Developments or examples, by which additional advantages may arise, also belong to the described examples.

An example provides that the terminal data describes at least one of the following navigation information: a destination, which has been searched and/or is currently selected in a route planner application of the mobile terminal, and/or a travel route, which has been searched and/or is currently activated in the route planner application. If the user has selected the destination and has activated a travel route determination for determining the travel route to the destination, respectively, by the route planner application of the mobile terminal, this information may be transferred from the mobile terminal to the motor vehicle as the navigation information. The currently activated travel route is that travel route, which is currently followed, thus, for which direction instructions are output and which is not only marked on a map representation of the route planner application. Thus, the activated travel route of the mobile terminal is provided as the travel route for the motor vehicle. If the actual navigation of the motor vehicle is performed by the route planner application of the mobile terminal, all of the relevant information to the destination as well as to the travel route is still provided to the motor vehicle, such that a driver assistance system of the motor vehicle can for example consider this information. Hereby, it is allowed that the driver assistance system of the motor vehicle may always informed, whereto the motor vehicle is driven. Hereby, an at least partially automatic driving function of the motor vehicle can for example be allowed, which for example requires at least the destination or the travel route as the information for its functionality.

A further example provides that the terminal data describes at least one of the following user information: a calendar entry, which is recorded in a calendar application of the mobile terminal; an Internet page, which has been visited by a browser application of the mobile terminal; a search term, which has been preset in an Internet search by the mobile terminal (for example in the browser application); an application installed on the mobile terminal; and/or an application used on the mobile terminal. In context of the installed and/or used application, a category, with which the installed or used application is associated, is in particular considered as the user information. For example, sports, social media, cooking, events and/or time planning can be distinguished as the category of the application, wherein the enumeration is not to be understood as conclusive.

For example, the calendar entry includes at least a type of the appointment, for example a telephone call or a video call, a location and/or at least one participating person. Depending on the calendar entry, a call function can for example be provided and/or a destination for the motor vehicle can be selected. Based on the Internet page, the search term and/or the installed and/or used application, at least one interest of the user can be inferred. For example, whenever a sports application is installed on the mobile terminal and/or is regularly used, it can be inferred that the user is interested in sports such that information to a currently nearby sports possibility such as for example a fitness studio, a sports area and/or a sports stadium can optionally be provided to the user as the personalized function in the motor vehicle.

Finally, the mentioned information is linked to personal interests and thus characteristics of the user, such that details about the person of the user are present to the control apparatus of the motor vehicle by providing and receiving this user information, such that the personalized function of the motor vehicle is allowed. Hereby, the comfort may further be increased for the user of the motor vehicle since the does not have to expensively communicate preferences of the user and interests to the motor vehicle, but the motor vehicle can get it in autonomous and thus automatic manner.

In this context, it can further be provided that only the user information is received, that is only the terminal data is received, which describes information, with which a point of time is associated, which is in a preset time interval starting from a current point of time. Thus, it can for example be provided that only the application is considered, which has been installed and/or used within the last for example three months. Further, only the search term and/or the Internet page can be considered, which has been searched or visited by the user within the time interval. Only the calendar entry can be considered, which relates to an appointment, which is within the time interval in the future related to the current point of time. A time interval relating to the future can be selected smaller than the time interval relating to the past. The time interval relating to the past can for example include the last day, the last three days, the last five days, the last week, the last two weeks, the last month, the last two months, the last three months or the last half year starting from a current day. The time interval relating to the future can for example consider the remaining current day, the next day, the next three days or the next week starting from the current point of time. The time interval can be any time interval between the mentioned intervals. Thus, it is for example ensured that an application, which is installed on the mobile terminal, but for example was not used anymore for multiple months, is for example not evaluated to the effect that a content or a category of this application discloses information about current preferences of the user, since this application was obviously not used over a longer time. If the last use of the application is optionally outside of the preset time interval in this example, this application can for example be ignored and thus information relating to the application for example cannot be received by the motor vehicle.

A further example provides that the personalized function is at least one of the following functions: a proposal of a special destination as a new destination and/or as an intermediate destination; a voice input function for an application of the mobile terminal, which is at least supported by a microphone device of the motor vehicle and/or a voice assistant of the motor vehicle; an output of weather information for the destination; and/or a proposal for performing a function at least capable of being supported by a device of the motor vehicle, in particular a telephone call.

For example, a restaurant can be proposed as a special destination, for which data of a cooking application is evaluated as the terminal data. Alternatively, the special destination can be a location, at which a certain object can for example be purchased, in which the user has interest for example due to the search term of his Internet search and/or the visited Internet page. For example, if the search term in the Internet search by the mobile terminal indicates that the user is interested in a new booster seat for his motor vehicle, a nearby specialist shop for booster seats can for example be recommended to him as the special destination. This special destination can be proposed either as a new destination or alternatively as an intermediate destination, that is while maintaining the current destination.

For example, the voice input function can support the operation of one of the applications on the mobile terminal by the motor vehicle such that it can for example be responded to a message in the social media application by the motor vehicle without the mobile terminal having to be actively operated by the user hereto. This is possible in that it is resorted to the voice input function of the motor vehicle. Herein, either a microphone device of the motor vehicle, which comprises at least one microphone, and/or a voice assistant for example capable of being provided by the control apparatus of the motor vehicle can be used.

Based on the destination information, a weather forecast, that is a weather outlook, for the destination can further be displayed by the motor vehicle in order that the user can early adapt to the weather conditions at the destination. Further functions can further at least be supported. In addition to the telephone call, the user can for example be informed how a currently running football match proceeds, if a great interest for example in football, in particular in football matches of a certain club, can be determined for example due to user history in the browser application or due to an application used by the user. Alternatively or additionally to information to the football match, tickets for a football match can then be offered, a match score can be communicated and/or a video, which shows at least a section of the football match, can be provided to the user, which the user can for example watch in a fully automatic travel and/or during a stop of the motor vehicle at traffic lights or in a traffic jam. The motor vehicle can request and receive the information required hereto, that is for example data describing the football match and/or the video, from the external entity.

Thus, numerous user-specific evaluations of the provided terminal data are possible to be able to provide an extensive and user-specific function by the motor vehicle to the user.

In an advantageous example, it is provided that the proposal and/or the weather information are displayed by a display device of the motor vehicle. For example, the display device is a screen arranged in the motor vehicle, in particular a touch-sensitive screen. Further, the proposal and/or the weather information can be acoustically output, for example by a speaker device of the motor vehicle, which includes at least one speaker. The proposal and/or the weather information can also be optically and/or acoustically output and thereby be easily comprehensible for the user.

In addition, an example provides that the proposal can be accepted or refused by actuating an actuation device of the motor vehicle. The actuation device is for example an element on the touch-sensitive screen, a switch, a key, a rotary-push switch and/or a button. Further, the actuation can be acoustically effected, that is, an audio signal captured by the microphone device can be captured by means of the voice assistant and be evaluated for determining the acceptance and/or refusal of the proposal. Upon accepting the proposal, the function proposed according to the proposal is activated, that is the proposed function can at least be supported and be completely performed for example by the control apparatus of the motor vehicle. Further, the special destination can be approached in that the special destination is for example activated as a new destination or intermediate destination such that the motor vehicle can be manually and/or for example at least partially autonomously driven to the special destination supported by the navigation system.

According to an additional example, it is provided that the at least partially automatic driving function of the driver assistance system is one of the following functions: keeping a lane; changing a lane; turning from a lane; adjusting a speed of the motor vehicle; activating a direction indicator of the motor vehicle; and/or activating an efficiency mode for a propulsion device of the motor vehicle. The driving function is each associated with at least one certain driver assistance system, such as for example a lane keeping assistant in case of keeping the lane, a lane change assistant in case of the change of the lane and/or turning from the lane. In an at least partially automatic vehicle guidance of the motor vehicle, turning from the lane can further also be capable of being automatically performed by the driver assistance system. A cruise control of the driver assistance system can provide the adjustment of a speed of the motor vehicle and keeping this speed as the function. The direction indicator, that is a turn signal of the motor vehicle, can for example be activated by the lane change assistant and/or another driver assistance system at least controlling the lateral guidance of the motor vehicle. The efficiency mode for example relates to an optimization of a propulsion power, which is provided by the propulsion device, with regard to the travel route. In other words, the efficiency mode can for example be an energy saving mode, which for example plans charging stops and/or charging times depending on the travel route with regard to a minimization of the energy demand. The use of the navigation information provided by the mobile terminal, which is described by the terminal data, thus considerably extends beyond a pure navigation control since the at least partially automatic driving function of the driver assistance system is at least supported and in an example provided based on information of the mobile terminal.

In addition, an example provides that a charging strategy for a high-voltage battery of the motor vehicle is ascertained and provided by evaluating the received terminal data. Hereto, the navigation information may be evaluated. Thus, a residual range of an electric vehicle as the motor vehicle can for example be calculated since information about a planned way distance, that is the travel route, is known due to the provided navigation information. Therefore, it can for example be determined in time, how much energy has to be available in an energy storage, that is the high-voltage battery of the motor vehicle, in order that the travel destination can be reached. Alternatively or additionally to the charging strategy, a fuel consumption of a combustion engine as the propulsion device and a refueling strategy for a fuel tank of the motor vehicle can be determined. Thus, the charging strategy and/or refueling strategy can be reliably provided supported by the terminal data of the mobile terminal. Hereby, undesired longer charging stops can for example be prevented if the actual destination is not present to the motor vehicle due to the navigation by means of the route planner application of the mobile terminal.

An additional example provides that establishing the communication link is effected if the mobile terminal is positioned in the motor vehicle. Thus, the terminal data is only received by the motor vehicle whenever the mobile terminal is actually arranged in the motor vehicle, for example in a retaining device provided hereto.

Alternatively or additionally thereto, it can be provided that the establishment of the communication link is effected if the establishment is manually initiated by the mobile terminal. Thus, it can be provided that the user of the mobile terminal first has to actuate an actuation device of the mobile terminal to initiate the transfer of the terminal data to the motor vehicle. For example, the user can perform this by an application associated with the motor vehicle on the mobile terminal. Then, it is possible that the terminal data is also provided to the motor vehicle if the mobile terminal is not located in the motor vehicle at all. Thus, for example half an hour or longer before a start of travel of a travel with the motor vehicle, the terminal data can already be provided to the motor vehicle such that it can particularly advantageously plan the charging strategy and the other described driving functions and personalized functions, respectively, of the motor vehicle.

Alternatively or additionally thereto, it is possible that the establishment of the communication link is effected automatically and independently of a current position of the mobile terminal. Thus, it can be provided that the mobile terminal synchronizes itself with the motor vehicle in preset time intervals and transfers the terminal data to the motor vehicle in this context. Further, it can be provided that the mobile terminal data synchronizes itself with the external entity and the external computer device transfers the terminal data to the motor vehicle in preset time intervals. However, the mobile terminal may always be provided at least as an intermediary to the motor vehicle such that a user profile of the user is for example linked to the mobile terminal in the external entity and the mobile terminal is in turn linked to the motor vehicle for example via a motor vehicle application in order that the terminal data can be provided to the motor vehicle from the user profile. Thus, the terminal data is finally provided by the mobile terminal.

Thus, numerous different data transmission triggers are possible such that the method is particularly versatile.

In addition, the described examples include combinations of the features of the described examples. Thus, the described examples also includes realizations, which each comprise a combination of the features of multiple of the described examples if the described examples have not been described as mutually exclusive.

A further aspect of an example relates to a motor vehicle. The motor vehicle is formed to establish a communication link between a communication interface of the motor vehicle and a communication interface of a mobile terminal, which is associated with a user of the motor vehicle. Further, the motor vehicle is formed to receive terminal data, which is recorded on the mobile terminal and which describes at least navigation information and/or user information relating to the user. Further, the motor vehicle is formed to provide an at least partially automatic driving function of a driver assistance system of the motor vehicle and/or a personalized function in the motor vehicle by evaluating the received terminal data.

In an example, the motor vehicle comprises features as they have already been described in context of the methods according the described examples, in individual manner or in the combination thereof, also belong to the described examples. For this reason, the corresponding examples of the motor vehicle according to the described examples are not again described here.

For example, the motor vehicle according may be configured as a car, in particular as a passenger car or truck, or as a passenger bus or motorcycle.

A further aspect of an example relates to a system including the described motor vehicle as well as the mobile terminal, wherein the system is formed to perform the methods according to the examples as it was described above. The system according to the described examples of the methods, which comprise features as they have already been described in context of the methods, in individual manner or in the combination thereof, also belong to the described examples. For this reason, the corresponding examples of the system according to the described examples are not again described here.

The control apparatus for the motor vehicle also belongs to the described examples. The control apparatus can comprise a data processing device or a processor device, which is configured to perform the methods according to the examples or of the examples of the methods to be performed by the motor vehicle, in individual manner or in combination. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise program code, which is configured, upon execution by the processor device, to perform the steps of the method according to the described examples or of the examples of the method to be performed by the motor vehicle, in individual manner or in combination. The program code can be stored in a data storage of the processor device.

BRIEF DESCRIPTION OF THE DRAWINGS

These and other aspects and advantages will become more apparent and more readily appreciated from the following description of the examples, taken in conjunction with the accompanying drawings of which:

FIG. 2 in schematic representation, a signal flow graph of a method for providing an at least partially automatic driving function and/or a personalized function in a motor vehicle.

DESCRIPTION

Figure 1:
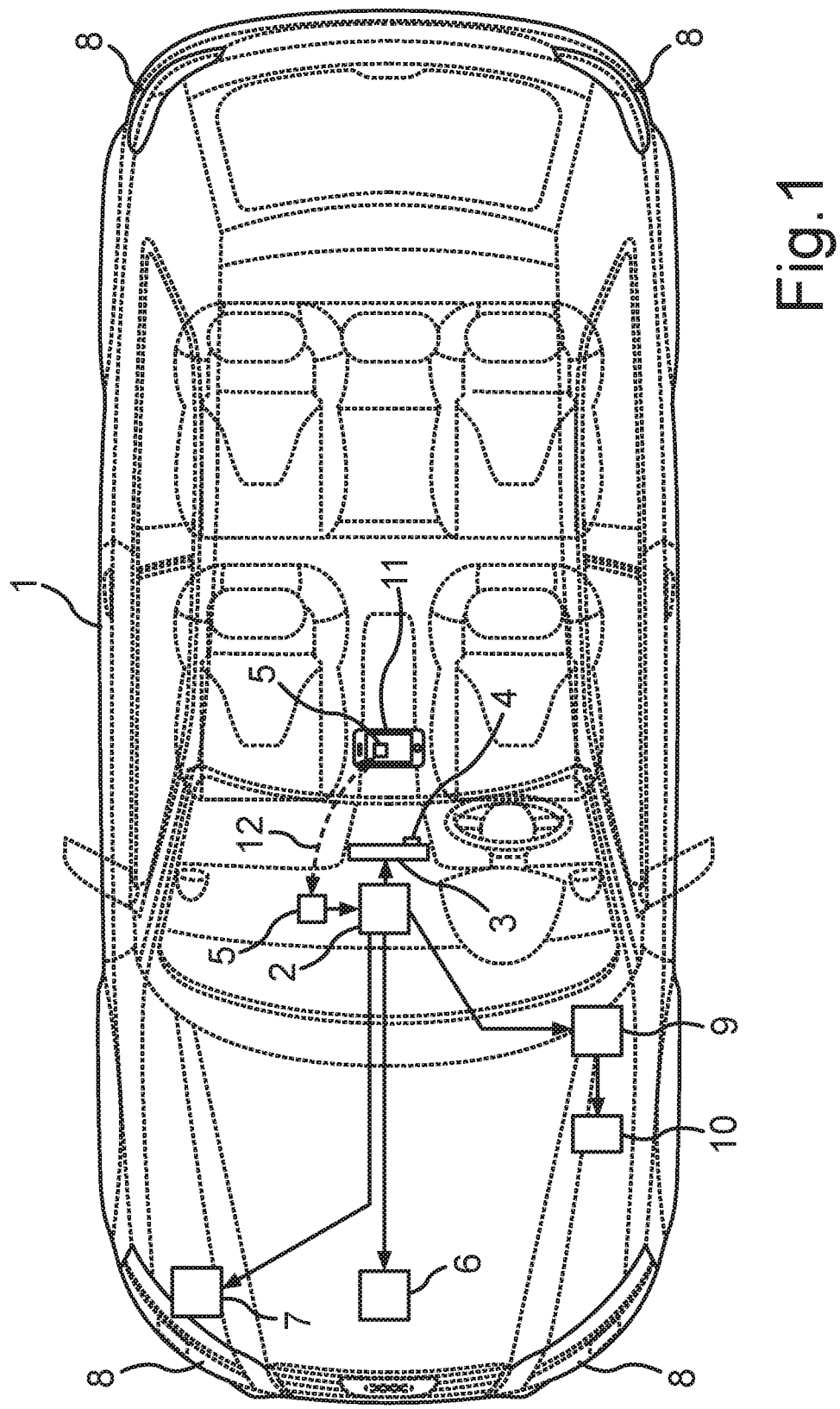
FIG. 1 a schematic representation of a motor vehicle with a communication interface for a mobile terminal.

The descriptions in the following are examples of invention. In the examples, the described components of the examples each represent individual features of the examples to be considered independently of each other, which also each develop the examples independently of each other. Therefore, the disclosure is to include also combinations of the features of the examples different from the illustrated ones. Furthermore, the described examples can also be supplemented by further ones of the already described features of the examples.

In the figures, identical reference characters each denote functionally identical elements.

In FIG. 1, a motor vehicle 1 is outlined. The motor vehicle 1 comprises a control apparatus 2, which for example comprises at least one microprocessor and/or microcontroller. The control apparatus 2 can be formed to actuate and/or control a longitudinal and/or transverse guidance of the motor vehicle 1.

The motor vehicle 1 comprises a display device 3, which is here exemplarily formed as a screen, in particular as a touch-sensitive screen. Further, the motor vehicle 1 comprises an actuation device 4, which can be configured as an element on the touch-sensitive screen of the display device 3. Alternatively or additionally thereto, the actuation device 4 can be formed as a button, switch, key and/or rotary-push switch. Alternatively to the display device 3, an acoustic output device, for example a speaker device, which includes at least one speaker, can be provided in the motor vehicle 1 (not outlined here). Alternatively or additionally to the described actuation device 4, an acoustic actuation device 4 can be provided, such as for example a microphone device, which includes at least one microphone, such that an acoustic actuation with the aid of a voice command can be captured.

The motor vehicle 1 comprises a communication interface 5. The communication interface 5 can be formed both for tethered, for example for wired, and for cordless, in particular wireless, communication. The communication interface 5 can provide data for the control apparatus 2, preferably by means of a wired communication link. Further, the communication interface 5 can be a component of the control apparatus 2 (not outlined here).

The motor vehicle 1 can comprise a motor control device 6, a light control device 7 for actuating a lighting device 8 of the motor vehicle 1, and a charging control device 9 for controlling a high-voltage battery 10 of the motor vehicle 1. The control apparatus 2 can generate data and/or a control command for one or more of the mentioned devices and transfer it to the respective device, that is to the motor control device 6, the light control device 7 and/or the charging control device 9. The devices mentioned here are to be purely exemplarily understood. Further, the control apparatus 2 can be formed to actuate other devices and components of the motor vehicle 1.

In an example, the motor vehicle 1 comprises an at least partially automatic driving function 23 (see reference character 23 in FIG. 2), wherein it can be performed by the control apparatus 2. Thus, the control apparatus 2 can for example perform a function of a driver assistance system of the motor vehicle 1, wherein an at least partially automatic actuation of the longitudinal and/or transverse guidance of the motor vehicle 1 can be provided by the driver assistance system.

In the motor vehicle 1, a mobile terminal 11 may be positioned. It also comprises the communication interface 5. Here, a cordless communication link 12 is established between the communication interface 5 of the mobile terminal 11 and the communication interface 5 of the motor vehicle 1. Alternatively thereto, the communication link 12 can be a tethered communication link 12. The cordless communication link 12 can be established via a local network (WLAN, for "wireless local area network"), a Bluetooth (BLUETOOTH) link and/or a mobile data network, for example based on the mobile radio standard Long Term Evolution (LTE), Long Term Evolution Advanced (LTE-A), Fifth Generation (5G) and/or Sixth Generation (6G).

In FIG. 2, method steps S1, S2 and S3 for a method of providing an at least partially automatic driving function 23 and/or a personalized function 24 in the motor vehicle 1 are outlined. In a method step S1, establishing the communication link 12 between the communication interface 5 of the motor vehicle 1 and the communication interface 5 of the mobile terminal 11 is effected. The mobile terminal 11 is associated with a user of the motor vehicle 1. In an example, a motor vehicle application specific to motor vehicle is installed on the mobile terminal 11, which indicates that the mobile terminal 11 is actually associated with the user of the motor vehicle 1.

Establishing the communication link 12 can for example be effected whenever the mobile terminal 11 is positioned in the motor vehicle 1. Alternatively or additionally thereto, establishing may always be effected by being manually initiated, wherein it can be initiated by the mobile terminal 11. Alternatively or additionally thereto, establishing the communication link 12 can be initiated in the motor vehicle 1, for example by actuating the actuation device 4 of the motor vehicle 1. Alternatively or additionally thereto, establishing the communication link 12 can be effected automatically and independently of the current position of the mobile terminal 11. Hereto, fixed synchronization intervals can for example be provided such that the mobile terminal 11 for example links to the motor vehicle 1 every 3 minutes, 5 minutes, 10 minutes, 30 minutes, each hour, every 3 hours, 6 hours, 12 hours, 24 hours, 2 days, 3 days or 7 days. Further, an alternative time interval between the mentioned time intervals can be selected.

In a method step S2, receiving terminal data 13 in the motor vehicle 1 is effected. The terminal data 13 is recorded on the mobile terminal 11, wherein it is stored on it hereto and/or can be transferred from an external entity to the mobile terminal 11 such that only a link to the terminal data 13 is stored on the mobile terminal 11, whereas the terminal data 13 itself may be stored in the external entity. In this case, the terminal data 13 is provided from the external entity to the mobile terminal 11 if it is to be transferred to the motor vehicle 1. The external entity is for example a computing device like a server, a cloud or a backup computer.

The terminal data 13 describes at least navigation information 14 and/or user information 15 relating to the user. For example, the navigation information 14 describes a destination 16, which has been searched or is currently selected in a route planner application of the mobile terminal 11. Alternatively or additionally thereto, the navigation information 14 describes a travel route 17, which has been searched and/or is currently activated in the route planner application, that is which is currently followed by the route planner application.

For example, the user information 15 describes a calendar entry 18, which is recorded in a calendar application of the mobile terminal 11. Alternatively or additionally thereto, the user information 15 describes an Internet page 19, which has been visited by a browser application of the mobile terminal 11. Alternatively or additionally thereto, the user information 15 describes a search term 20, which has been preset in an Internet search by the mobile terminal 11, that is for which the user has searched. Alternatively or additionally thereto, the user information 15 describes an application 21 installed on the mobile terminal 11, in particular a category of the installed application 21, with which the installed application 21 is associated. Alternatively or additionally thereto, the user information 15 describes an application 22 actually used on the mobile terminal 11, in particular a category, with which the used application 22 is associated.

Further, it can be provided that only such terminal data 13 is received, thus, only such user information 15 and/or navigation information 14, which describes an information, which is associated with a point of time, which is in a preset time interval. Hereby, it can be prevented that outdated data is for example transferred to the motor vehicle 1, which is no longer up to date and thus no longer relevant.

In a method step S3, providing an at least partially automatic driving function 23 of a driver assistance system of the motor vehicle 1 and/or a personalized function 24 in the motor vehicle 1 is effected by evaluating the received terminal data 13. This evaluation is effected by the control apparatus 2 of the motor vehicle 1. The provided partially automatic driving function 23 can for example be provided to the motor control device 6, the light control device 7 and/or the charging control device 9. The personalized function 24 can also have influence on the mentioned control devices and/or for example result in a display on the display device 3.

The personalized function 24 can comprise one of the following functions: a proposal of a special destination 25 as a new destination 16 and/or intermediate destination. The new special destination 25 can for example be a restaurant recommendation and/or a recommendation of a shopping possibility, such as for example a shop. Alternatively or additionally thereto, the personalized function 24 can be a voice input function 26 for an application 21, 22 of the mobile terminal 11, such as for example a social media application. Thereupon, the voice input function 26 can be at least supported by the microphone device of the motor vehicle 1 and/or the voice assistant of the motor vehicle 1 such that the user can for example dictate a message for the social media application in the motor vehicle 1. Alternatively or additionally thereto, the personalized function 24 can provide an output of weather information 27 for the destination 16 such that the weather information 27 can for example be provided based on the destination 16, which is described by the navigation information 14. Alternatively or additionally thereto, the personalized function 24 can be a proposal for performing a function capable of being performed by a device of the motor vehicle 1, such as for example a telephone call 28.

The proposal and/or the weather information 27 can be displayed by the display device 3 of the motor vehicle 1. Upon the proposal, a response of the user can be captured by actuation of the actuation device 4 of the motor vehicle 1 such that the user can accept or refuse the proposal. Upon acceptance of the proposal, the function proposed according to the proposal is activated such that the telephone call 28 is for example performed and/or the special destination 25 is activated as a new destination 16 or as an intermediate destination.

The at least partially automatic driving function 23 of the driver assistance system can be one of the following functions: Stopping 29, changing 30 and/or turning 31 from a lane 32 can be provided. Thus, it can be intervened in the transverse guidance of the motor vehicle 1, for example based on the navigation information 14 encompassed by the terminal data 13. Further, a speed 33 of the motor vehicle 1 can be adjusted, thus a cruise control can be controlled as a driver assistance system, which can actuate the longitudinal guidance of the motor vehicle 1. Alternatively or additionally thereto, a direction indicator 34 can be activated, that is for example a turn signal for turning 31 can be set, if the motor vehicle 1 is for example guided by a driver assistance system at least actuating the transverse guidance of the motor vehicle 1. Alternatively or additionally thereto, an efficiency mode 35 for a propulsion device of the motor vehicle 1 can be activated. Hereto, a corresponding control command for the motor control device 6 of the control apparatus 2 can for example be provided.

Further, it can be provided that not only a driver assistance system with the at least partially automatic driving function 23 is provided, but that the motor vehicle 1 is formed for fully automatically driving. Thus, a fully automatic driving function 23 is provided in this case based on the terminal data 13 as well as optionally further sensor data captured by the motor vehicle 1. Further, it can be provided that a charging strategy 36 is provided for the high-voltage battery 10 of the motor vehicle 1 by evaluating the received terminal data 13. Hereto, the control apparatus 2 can transfer corresponding information to the charging control device 9.

Overall, the examples show a networking of smartphone visualization services with a vehicle infotainment architecture. This includes the specific communication between the mobile terminal 11 of the user and the vehicle infotainment architecture, that is the control apparatus 2 of the motor vehicle 1, via a newly introduced communication interface 5 of the motor vehicle 1. An in-vehicle monitor, that is the display device 3, is no longer only a pure visualization of the user interface of the mobile terminal 11. The infotainment architecture of the motor vehicle 1, that is the control apparatus 2, can offer the following exemplary optimizations and services by picking up the smartphone information, that is the terminal data 13: The efficiency mode 35 (powertrain is optimized to the distance to be traveled); calculating a residual range (in particular in electric vehicles, the knowledge of the planned way distance is essential for the charging station strategy); and services/advertisement (by knowledge of the way distance, that is the travel route 17, services such as for example a repair and/or services of partners, for example restaurants, can be offered according to target group). Further, autonomous driving functions 23 can be offered, which are for example calculated based on the travel route 17 and/or the destination 16. Information from social media, that is the user information 15, can be evaluated for services, offers and/or functions on demand, that is functions reloadable in the motor vehicle 1. Optionally, information with captured images or text messages of the mobile terminal 11 can be used for advertisement and/or services according to target group. Thus, the contents of the used applications 22 can be evaluated. The communication link 12 can be effected either via cordless data transmission or by tethered data transmission and has to be moderated by suitable software and exchange algorithms.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide* v. *DIRECTV,* 358 F3d 870, 69 USPQ2d 1865 (Fed. Cir. 2004).

The invention claimed is:

1. A method of providing an at least partially automatic driving function and/or a personalized function in a motor vehicle, the method comprising:
   by a computing device of the motor vehicle, causing execution of a process including,
      establishing a communication link between a communication interface of the motor vehicle and a communication interface of a mobile terminal associated with a user of the motor vehicle;
      receiving terminal data through the communication link from the mobile terminal, the terminal data describes navigation information and/or user information relating to the user; and
      evaluating the terminal data to provide in the motor vehicle an at least partially automatic driving function of a driver assistance system of the motor vehicle and/or a personalized function in the motor vehicle,
   wherein
   the personalized function is at least one function from among functions including,
      a voice input function for an application of the mobile terminal, which is at least supported by a microphone device of the motor vehicle and/or a voice assistant of the motor vehicle;
      a function to output weather information for a destination indicated by the navigation information; and/or
   the at least partially automatic driving function of the driver assistance system of the motor vehicle is at least one function from among functions including,
      keeping a lane;
      changing a lane;
      turning from a lane;
      adjusting a speed of the motor vehicle;
      activating a direction indicator of the motor vehicle; and/or
      activating an efficiency mode for a propulsion device of the motor vehicle.

2. The method according to claim 1, wherein the navigation information includes:
   a destination, which has been searched and/or is currently selected in a route planner application of the mobile terminal; and/or
   a travel route, which has been searched and/or is currently activated in a route planner application.

3. The method according to claim 1, wherein the user information includes:
   a calendar entry, which is recorded in a calendar application of the mobile terminal;
   an Internet page, which has been visited by a browser application of the mobile terminal;
   a search term, which has been preset in an Internet search by the mobile terminal;
   an application installed on the mobile terminal, in a category with which the installed application is associated; and/or
   an application used on the mobile terminal, in a category, with which the used application is associated.

4. The method according to claim 1, wherein the personalized function is at least one function from among functions including:
   a proposal of a special destination as a new destination and/or as an intermediate destination; and/or
   a proposal to perform a function at least capable of being supported by a device of the motor vehicle, the function to be performed including a telephone call.

5. The method according to claim 4, wherein the proposal and/or the weather information are displayed by a display device of the motor vehicle.

6. The method according to claim 4, wherein the proposal is accepted or refused by actuating an actuation device of the motor vehicle, wherein upon acceptance of the proposal, the function proposed according to the proposal is activated.

7. The method according to claim 1, wherein the process includes ascertaining a charging strategy for a high-voltage battery of the motor vehicle, based on evaluating the received terminal data.

8. The method according to claim 1, wherein the establishing of the communication link is effected if the mobile terminal is positioned in the motor vehicle and/or if the establishing is initiated manually by the mobile terminal and/or automatically independently of a current position of the mobile terminal.

9. A motor vehicle, comprising:
   a computing device to execute a process to,
      establish a communication link between a communication interface of the motor vehicle and a communication interface of a mobile terminal associated with a user of the motor vehicle;
      receive terminal data through the communication link from the mobile terminal, the terminal data describes navigation information and/or user information relating to the user; and
      evaluate the terminal data to provide in the motor vehicle an at least partially automatic driving function of a driver assistance system of the motor vehicle and/or a personalized function in the motor vehicle, wherein
the personalized function is at least one function from among functions including,
a voice input function for an application of the mobile terminal, which is at least supported by a microphone device of the motor vehicle and/or a voice assistant of the motor vehicle;
a function to output weather information for a destination included in the navigation information; and/or
the at least partially automatic driving function of the driver assistance system of the motor vehicle is at least one function from among functions including,
keeping a lane;
changing a lane;
turning from a lane;
adjusting a speed of the motor vehicle;
activating a direction indicator of the motor vehicle; and/or
activating an efficiency mode for a propulsion device of the motor vehicle.

10. The motor vehicle according to claim 9, wherein the navigation information includes:
a destination, which has been searched and/or is currently selected in a route planner application of the mobile terminal; and/or
a travel route, which has been searched and/or is currently activated in a route planner application.

11. The motor vehicle according to claim 9, wherein the user information includes:
a calendar entry, which is recorded in a calendar application of the mobile terminal;
an Internet page, which has been visited by a browser application of the mobile terminal;
a search term, which has been preset in an Internet search by the mobile terminal;
an application installed on the mobile terminal, in a category with which the installed application is associated; and/or
an application used on the mobile terminal, in a category, with which the used application is associated.

12. The motor vehicle according to claim 9, wherein the personalized function is at least one function from among functions including:
a proposal of a special destination as a new destination and/or as an intermediate destination; and/or
a proposal to perform a function at least capable of being supported by a device of the motor vehicle, the function to be performed including a telephone call.

13. The motor vehicle according to claim 12, wherein the proposal and/or the weather information are displayed by a display device of the motor vehicle.

14. The motor vehicle according to claim 12, wherein the proposal is accepted or refused by actuating an actuation device of the motor vehicle, wherein upon acceptance of the proposal, the function proposed according to the proposal is activated.

15. The motor vehicle according to claim 9, wherein the process includes ascertaining a charging strategy for a high-voltage battery of the motor vehicle, based on evaluating the received terminal data.

16. The motor vehicle according to claim 9, wherein the establishing of the communication link is effected if the mobile terminal is positioned in the motor vehicle and/or if the establishing is initiated manually by the mobile terminal and/or automatically independently of a current position of the mobile terminal.

* * * * *